United States Patent [19]

Hijikata

[11] Patent Number: 5,017,304

[45] Date of Patent: May 21, 1991

[54] LIQUID-CRYSTALLINE POLYMER

[75] Inventor: Kenji Hijikata, Mishima, Japan

[73] Assignee: Polyplastics Co., Ltd., Osaka, Japan

[21] Appl. No.: 383,261

[22] Filed: Jul. 20, 1989

Related U.S. Application Data

[63] Continuation of Ser. No. 110,883, Oct. 21, 1987, abandoned.

[30] Foreign Application Priority Data

Oct. 22, 1986 [JP] Japan ............................ 62-251424

[51] Int. Cl.$^5$ ............................................. C09K 19/52
[52] U.S. Cl. ............................ 252/299.01; 252/299.1;
252/299.68; 528/190; 528/196; 528/271;
524/605
[58] Field of Search ................ 524/605; 528/190, 196,
528/271; 252/299.01, 299.1, 299.68

[56] References Cited

U.S. PATENT DOCUMENTS

| | | | |
|---|---|---|---|
| 4,184,996 | 1/1980 | Calundann | 528/171 |
| 4,371,660 | 2/1983 | Calundann | 524/605 |
| 4,375,530 | 3/1983 | Hay | 528/171 |
| 4,431,770 | 2/1984 | East | 524/605 |
| 4,457,962 | 7/1984 | Jaffe | 528/190 |
| 4,473,682 | 9/1984 | Calundann et al. | 524/605 |
| 4,499,256 | 2/1985 | Blundell et al. | 528/173 |
| 4,539,386 | 9/1985 | Yoon | 528/271 |

Primary Examiner—William R. Dixon, Jr.
Assistant Examiner—David M. Brunsman
Attorney, Agent, or Firm—Birch, Stewart, Kolasch & Birch

[57] ABSTRACT

A liquid-crystalline polymer which comprises a new copolymer comprised on one constituent for the main chain thereof containing two or more different naphthalene groups and a different constituent, said polymer being capable of forming the anisotropic phase in the molten state and is improved in the mechanical strength.

10 Claims, No Drawings

LIQUID-CRYSTALLINE POLYMER

This application is a continuation of application Ser. No. 07/110,883 filed on Oct. 21, 1987, now abandoned.

BACKGROUND OF THE INVENTION

1. Field of the Invention

The present invention relates to a liquid-crystalline polymer which has the high strength (with small anisotropic variation) and exhibits the anisotropism in its molten state.

2. Discussion of Related Art

Liquid-crystalline polymers which exhibit the anisotropism in their molten state have recently been attracting attention because of their high strength, high heat resistance, and superior moldabiltiy. A variety of liquid-crystalline polymers have been proposed so far; and typical ones are disclosed in Japanese Patent laid-open Nos. 72393/1974, 43223/1975, and 50594/1979. All of these polymers have a skeleton composed of rigid monomers so that they exhibit liquid-crystalline properties and provide high strength and good processability.

Liquid-crystalline polymers, however, have a disadvantage in that they are extremely susceptible to orientation because they have rigid skeletons. The susceptibility to orientation leads to the anisotropy of orientation and strength, with the result being in that the molded articles formed from these liquid-crystalline polymers are subject to fibrillation. The attempts made so far to reduce the anisotropism, include the introduction of soft spacers into the rigid skeleton and the introduction of reinforcements into the polymer. The former sacrifices the high strength ascribing to the rigidity, and the latter, the sacrifices the characteristic properties of the resin such as light weight, chemical resistance, and modability. Reducing the anisotropism of strength without impairing the superior mechanical strength of the rigid polymer is very important in increasing the dimensional accuracy of precision parts and to produce film having high mechanical strength.

The present inventors carried out extensive studies noticing that the polymer having the naphthalene skeleton in the main chain (as typified by Japanese Patent Laid-open No. 50594/1979) has high strength and superior melt-processability although it is composed of p-position benzene rings and naphthalene rings and is not incorporated with the so-called soft spacer. The results of the studies led to the present invention.

SUMMARY OF THE INVENTION

The present invention relates to a liquid-crystalline polymer exhibiting anisotropism in its molten state, which comprises a copolymer composed of a constituent having two or more different naphthalene groups attached to the main chain and a different constituent.

In other words, the present invention provides a liquid-crystalline polymer which is a copolymer of one constituent for the main chain thereof containing two or more different naphthalene groups and a different consitituent, said polymer being capable of forming the anisotropic phase in the molten state.

The liquid-crystalline polymer of the present invention is a melt-processable polymer having such characteristic properties that the polymer molecule chains are regularly oriented parallel to one another in the molten state. The state in which molecules are oriented in this manner is referred to as a liquid-crystal state or a nematic phase of liquid crystal substance. A polymer so defined is composed of monomers which are long and narrow, flat, and rigid along the long axis of the molecule and have a plurality of chain extension bonds coaxial or parallel to one another.

Using various types or naphthalene compounds to reduce anisotropism is not obvious. Heretofore, they are usually used as a mesogen to provide rigidity. Some typical examples are disclosed in Japanese Patent Laid-Open Nos. 72393/1974, 188423/1985 and 106622/1986. It is surprising to note that the introduction of a naphthalene compound containing various isomers does not remarkably reduce the mechanical strength for the reduction of anisotropism.

DETAILED DESCRIPTION OF THE INVENTION

The naphthalene compound that can be advantageously used in the present invention is one which has functional groups at two or more substituting positions selected from 1,2-position, 1,4-position, 1,5-position, 1,8-position, 2,3-position, 2,6-position, and 2,7-position. The functional group may be any functional group capable of forming a polyester and/or polyesteramide. Such groups are selected from hydroxyl group, carboxyl compound, amino group, and ester group.

The preferred naphthalene group is hydroxynaphthoic acid, dihydroxynaphthalene, and/or naphthalenedicarboxylic acid.

Those which realize the linearity of the main chain are the 2,6-substituted compounds. They should preferably account for more than 50% of the total amount of the naphthalene groups including the substituent groups.

The constituents, other than those having a naphthalene group, are constituents having a p-position phenyl group, 4,4'-biphenyl group, and/or a compound and substituted derivative thereof represented by Formula (A) below.

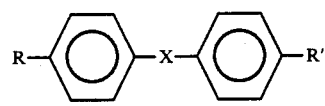

(A)

(where, X is a group selected from alkylene ($C_1$-$C_4$), alkylidene ($C_1$-$C_4$), —O—, —S—, —SO—, —$SO_2$—, and —CO—; and R and R' are reactive groups such as hydroxyl group and carboxyl group and esters thereof.)

The unit to bond the polymer should preferably be an ester and/or esteramide, and it is composed of functional groups selected from hydroxyl group, carboxyl group, amino group, and ester group.

Preferred example of compounds having the functional groups are terephthalic acid, hydroquinone, p-diacetoxyphenylene, and p-hydroxybenzoic acid and esters thereof, 4,4'-dihydroxybiphenyl, 4,4'-dicarboxybiphenyl, and 4-hydroxy-4'-carboxybiphenyl and esters thereof. Other preferred examples include dihydroxy compound, dicarboxy compound, hydroxycarboxy compound, and esters thereof represented by Formula (A) in which X is methylene, propenyl, or —$SO_2$—. Further preferred examples include terephthalic acid, hydroxybenzoic acid, 4,4'dihydroxybiphenyl, 4,4'-dicarboxybiphenyl, and esters thereof.

These mesogens which contain groups other than naphthalene groups should preferably account for more than 50 mol % of the total amount including the compounds having the naphthalene group.

The polyester and/or polyesteramide obtained in the present invention may be incorporated with a soft spacer except mesogen, according to the need. A detailed description in connection with soft spacer can be found in "Advances in Polymer Science", by Lentz et al., Vol. 59, p. 104 (1984). Typical example of the soft spacer include polymethylene, polyethylene oxide, and polysiloxane, and copolymers thereof such as polyalkylene terephthalate and polyalkylene oxyterephthalate.

Additional compounds which work in manner as a soft spacer include the ones which changes the angle of the molecule chain and the ones which introduce a substituent group into the mesogen to hinder the linearity three-dimensionally. Example of the former include isophthalic acid and examples of the latter include methylhydroquinone, phenyls methylene, phenylene substituted with a halogen at p-position, and 4,4'-biphenyl. They are effective copolymerizable compounds.

The polyester and/or polyesteramide of the present invention which exhibits anisotropism in its molten state can be produced by various ester-forming processes.

The monomer compound can be reacted by melt acidolysis in the absence of any heat exchange fluid. In this process, the monomer is heated to form a melt. As the reaction proceeds, solid polymer particles begin to be suspend in the melt. In the final stage of the condensation reaction, the reaction system may be evacuated to facilitate the removal of volatile by-products (e.g., acetic acid or water).

A slurry polymerization process may also be employed in the preparation of the liquid-crystalline polyester of the present invention. In this process, the solid product is obtained in the form of a suspension in a heat exchange medium.

No matter which process is used for polymerization, the organic monomeric reactants to form the liquid-crystalline polyester may be used in a modified form obtained by esterifying the hydroxyl group of the monomer at ambient temperature (i.e., in the form of their lower acyl esters). The lower acyl groups have preferably about 2 to 4 carbon atoms. Preferably, acetates of the organic monomeric reactants are employed in the reaction. Another modified form (e.g., phenol ester) obtained by esterifying the carboxylic acid group may also be used.

Typical examples of the catalysts usable in both the melt acidolysis and slurry processes include diakyltin oxides (such as dibutyltin oxide), diaryltin oxide, titanium dioxide, antimony trioxide, alkoxytitanium silicates, titanium alkoxides, alkali metal and alkaline earth metal salts of carboxylic acids (such as zinc acetate), Lewis acids (such as $BF_3$) and gaseous acid catalysts such as hydrogen halides (e.g., HCl). The catalyst is used in an amount of from about 0.001–1 wt %, particularly from about 0.01–0.2 wt %, based on the total weight of the monomer.

The aromatic polymers obtained in the present invention are substantially insoluble in ordinary solvents and, therefore, are not suitable for solution processing. However, theses polymers can be worked easily by the ordinary melt processing. Particularly preferred aromatic polymers are soluble in pentaflurophenol to some extent.

The aromatic polyester and/or polyesteramide obtained in the present invention usually have a weight-average molecular weight of from about 1,000–200,000, preferably from about 2,000–50,000, particularly from about 3,000–25,000.

The molecular weight may be determined by gel permeation chromatography or other standard methods in which no polymer solution is formed, such as a method in which terminal groups of a compression-molded film are determined by infrared spectroscopy. Alternatively, the molecular weight may be determined according to the light-scattering method after dissolution in pentafluorophenol.

A 0.1 wt % solution of the aromatic polyester or polyesteramide dissolved in pentafluorophenol at 60° C. usually has an inherent viscosity (I.V.) of at least from about 2.0 dl/g, for example, from about 2.0–10.0 dl/g.

The liquid-crystalline polymer of the present invention may be incorporated with various types of additives and/or fillers by the well-known method to improve the mechanical properties.

The additives are those substances which are commonly added to thermoplastic resins and thermosetting resins. They are a plasticizer, anti-oxidant, UV light stabilizer, anti-static agent, flame retardant, dye and pigment, blowing agent, divinyl compound, cross-linking agent (e.g., peroxide and vulcanizing agent), and lubricant (to improve flowability and releasability).

The fillers include inorganic fibers such as glass fiber, carbon fiber, metallic fiber, ceramic fiber, boron fiber, and asbestos; powdery substances such as calcium carbonate, highly dispersible silicate, alumina, aluminum hydroxide, talc, mica, glass flake, glass bead, quartz powder, silica sand, metal powder, carbon black, barium sulfate, and calcined gypsum; inorganic compounds such as silicon carbide, alumina, boron nitride, and silicon nitride; and whisker and metal whisker.

The liquid-crystalline polymer of the present invention which exhibits anisotropism in its molten state has decreased anisotropism of mechanical strength while retaining its inherent rigidity nearly intact. This was achieved without remarkably sacrificing the high strength ascribing to the rigidity. This resin composition provides an outstanding dimensional accuracy for precision parts and also provides a film of high mechanical strength because it has the decreased anisotropism of molecular orientation. By virtue of these characteristic properties, it is capable of being used in many fields.

This invention can be further illustrated by the following examples. It is to be understood that these examples are merely for purposes of illustration and are not intended to limit the scope of the invention.

EXAMPLE 1

In a reactor equipped with a stirrer, nitrogen inlet, and distillating pipe were charged b 1260 parts by weight of 4-acetoxybenzoic acid, 460 parts by weight of 2-acetoxy-6-naphthoic acid, and 230 parts by weight of 2-acetoxy-3-naphthoic acid. The reactants were heated at 260° C. under a nitrogen stream. The reaction was performed at 260° C. for 2.5 hours and at 280° C. for 3 hours with vigorous stirring. During the reaction, acetic acid was distilled away. The reaction temperature was further raised to 320° C. and the introduction of nitrogen was suspended. The reactor was gradually evacuated to 0.1 mmHg over 15 minutes. While keeping this temperature and pressure, stirring was continued for 1 hour.

The resulting polymer was found to have an intrinsic viscosity of 5.1 ( in 0.1 wt % solution in pentafluorophenol at 60° C.). According to the FT-IR spectrometry (KBR method), the formation of polyester was confirmed by the fact that the C=O peak attributable to the aromatic polyester bond appeared at 1750 cm⁻ and the peak attributable to the monomer disappearance.

In addition, the resulting polymer exhibited the pattern of nematic liquid crystal when melted on a hot plate under a polarization microscope. Thus it was confirmed that the resulting polymer exhibits anisotropism in its molten state.

The thus obtained polymer was crushed, while cooled with liquid nitrogen, into fibrous powder. The powder was injection-molded into a square plate neasuring 120×120×2 mm (with a side gate at the center of one side). The coefficient of linear expansion at 100°–150° C. and the flexural strength in the directions parallel to and perpendicular to the flow were measured. The results are shown in Table 1.

EXAMPLES 2 to 6 AND COMPARATIVE EXAMPLES 1 to 3

Polymers were prepared in the same manner as in Example 1 except that the molar ratio was changed as shown in Table 1. IR spectrometry was performed and intrinsic viscosity was measured. The anisotropism in the molten state was confirmed. The coefficient of linear expansion and the flexural strength were measured for the test pieces prepared as mentioned above. The results are shown in Table 1.

from the group consisting of 1,2-position, 1,4-position, 1,5-position, 1,8-position, 2,3-position and 2,7-position, the naphthalene group attached at the substituting 2,6-position is present in an amount of more than 50 mol % of the total amount of the naphthalene groups, and wherein said constituent containing said naphthalene groups are formed from monomers each having two different functional groups, said polymer being capable of forming the anisotropic phase in the molten state.

2. The liquid-crystalline polymer as claimed in claim 1, wherein said two different groups are individually selected from the group consisting of hydroxy group, carboxyl group, amino group and ester group.

3. The liquid-crystalline polymer as claimed in claim 2, wherein at least one of said monomers is hydroxynaphthoic acid.

4. The liquid-crystalline polymer as claimed in claim 1, wherein the liquid-crystalline polymer is a polyester of polyesteramide.

5. The liquid-crystalline polymer as claimed in claim 4, wherein said polymer has a weight-average molecular weight of from about 1,000–200,000.

6. The liquid-crystalline polymer as claimed in claim 5, wherein the weight-average molecular weight is from about 2,000–50,000.

7. The liquid-crystalline polymer as claimed in claim

TABLE 1

| Example and Compar. Example | Monomer composition (molar ratio) | | Intrinsic viscosity | Flexural strength (kg/cm²) | | | Coefficient of linear expansion (cm/cm °C. × 10⁻⁵) | | |
|---|---|---|---|---|---|---|---|---|---|
| | Naphthalene compound | Other monomer | | MD | TD | MD/TD | MD | TD | TD-MD |
| 1 | Acetoxynaphthoic acid (30) 2,6-position {67} 2,3-position {33} | Acetoxybenzoic acid (70) | 5.1 | 1210 | 670 | 1.81 | −0.8 | 2.0 | 2.8 |
| 2 | Acetoxynaphthoic acid (30) 2,6-position {70} 1,2-position {10} 2,3-position {20} | *Comparative acid (70) | 4.9 | 1190 | 660 | 1.80 | −0.6 | 1.9 | 2.5 |
| 1* | Acetoxynaphthoic acid (30) 2,6-position {100} | Acetoxybenzoic acid (70) | 5.4 | 1450 | 520 | 2.79 | −1.0 | 4.9 | 5.9 |
| 3 | Diacetoxynaphthalene (30) 2,6-position {50} 2,3-position {20} 2,7-position {30} | Terephthalic acid (70) | 5.0 | 1260 | 650 | 1.94 | −0.8 | 3.1 | 3.9 |
| 4 | Diacetoxynaphthalene (30) 2,6-position {60} 1,4-position {30} 2,3-position {10} | Terephthalic acid (70) | 4.9 | 1170 | 610 | 1.92 | −0.7 | 2.9 | 3.6 |
| 2* | Diacetoxynaphthalene (30) 2,6-position {100} | Terephthalic acid (70) | 5.0 | 1380 | 490 | 2.81 | −0.9 | 4.6 | 5.5 |
| 5 | Diacetoxynaphthalene (40) 2,6-position {70} 2,3-position {10} 2,7-position {20} | 4,4'-dicarboxybiphenyl (60) | 5.2 | 1290 | 590 | 2.18 | −0.9 | 2.5 | 3.4 |
| 6 | Diacetoxynaphthalene (40) 2,6-position {80} 2,3-position {20} | 4,4'-dicarboxybiphenyl (60) | 5.2 | 1240 | 610 | 2.13 | −0.8 | 2.5 | 3.3 |
| 3* | Diacetoxynaphthalene (40) 2,6-position {100} | 4,4'-dicarboxybiphenyl (60) | 5.7 | 1350 | 450 | 3.00 | −1.1 | 4.8 | 5.9 |

Comparative Example,
MD: parallel to flow,
TD: perpendicular to flow

What is claimed is:

1. A liquid-crystalline polymer which consists essentially of a copolymer consisting essentially of
    one constituent for the main chain thereof containing two or more different naphthalene groups,
    wherein said naphthalene groups are individually attached to the main chain at two or more substituting positions, said substituting positions composed of 2,6-position and at least one member selected 5, wherein the weight-average molecular weight is from about 3,000–25,000.

8. A liquid-crystalline polymer which consists essentially of a copolymer consisting essentially of
    one constituent of the main chain thereof containing two or more different naphthalene groups,
    wherein said naphthalene groups are individually attached to the main chain at two or more substituting positions, said substituting positions composed of 2,6-position and at least one member selected from the group consisting of 1,2-position, 1,4-position, 1,5-position, 1,8-position, 2,3-position and 2,7-position, the naphthalene group attached at the substituting 2,6-position is present in an amount of more than 50 mol % of the total amount of the naphthalene groups, and wherein said constituent containing said naphthalene groups are formed from monomers each having two different functional groups, and more than 50 mol% of the total amount of different constituents, in which said different constituents are comprised of a member selected from the group consisting of phenyl group, 4,4'-biphenyl group and a mixture thereof, and a compound or derivative thereof represented by formula A

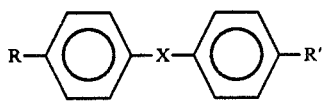

(A)

wherein X is alkylene ($C_1$–$C_4$), alkylidene ($C_1$–$C_4$), —O—, —S—, —SO—, —$SO_2$— or —CO—, R and R' are each reactive groups, said polymer being capable of forming the anisotropic phase in the molten state.

9. A liquid-crystalline polymer which consists essentially of a copolymer consisting essentially of one constituent for the main chain thereof containing two or more different naphthalene groups, wherein said naphthalene groups are individually attached to the main chain at two or more substituting positions, said substituting positions composed of 2,6-position and at least one member selected from the group consisting of 1,2-position, 1,4-position, 1,5-position, 1,8-position, 2,3-position and 2,7-position, the naphthalene group attached at the substituting 2,6-position is present in an amount of more than 50 mol % of the total amount of the naphthalene groups, and wherein said constituent containing said naphthalene groups are formed from monomers each having two different functional groups, and more than 50 mol % of the total amount of a different constituent, in which said different constituent contains a member selected from the group consisting of phenyl group, 4,4'-biphenyl group and a mixture thereof, of a compound or derivative thereof represented by formula A

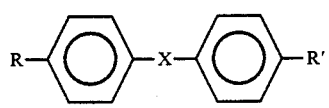

(A)

wherein X is alkylene ($C_1$–$C_4$), alkylidene ($C_1$–$C_4$), —O—, —S—, —SO—, —$SO_2$— or —CO—, R and R' are each reactive groups, said polymer being capable of forming the anisotropic phase in the molten state.

10. The liquid-crystalline polymer as claimed in claim 9, wherein said different constituent is formed from a monomer selected from the group consisting of terephthalic acid, hydroquinone, p-diacetoxyphenylene, and p-hydroxybenzoic acid and esters thereof, 4,4'-dihydroxybiphenyl, 4,4'-dicarboxybiphenyl and 4-hydroxy-4'-carboxybiphenyl and esters thereof.

* * * * *